United States Patent
Lee

(10) Patent No.: US 7,031,464 B2
(45) Date of Patent: Apr. 18, 2006

(54) RING RELAY CONTROL UNIT FOR FOREIGN EXCHANGE STATION

(75) Inventor: Jong Heon Lee, Kyonggi-do (KR)

(73) Assignee: LG Electronics Inc., Seoul (KR)

( * ) Notice: Subject to any disclaimer, the term of this patent is extended or adjusted under 35 U.S.C. 154(b) by 890 days.

(21) Appl. No.: 09/898,275

(22) Filed: Jul. 2, 2001

(65) Prior Publication Data

US 2002/0044643 A1    Apr. 18, 2002

(30) Foreign Application Priority Data

Oct. 17, 2000    (KR)    .............................. 2000-60992

(51) Int. Cl.
*H04M 1/00* (2006.01)
(52) U.S. Cl. ............. 379/413.01; 379/418; 379/375.01
(58) Field of Classification Search ........... 379/375.01, 379/413.01, 418
See application file for complete search history.

(56) References Cited

U.S. PATENT DOCUMENTS 5,666,355 A *  9/1997  Huah et al. .................. 370/311
5,790,654 A *  8/1998  Eklof ..................... 379/375.01
6,434,225 B1 * 8/2002  Azami et al. .......... 379/142.01

* cited by examiner

*Primary Examiner*—Jefferey F. Harold
(74) *Attorney, Agent, or Firm*—Lee, Hong, Degerman, Kang & Schmadeka

(57) ABSTRACT

The ring relay control unit of an FXS includes a main control unit for controlling relay interrupt command; a relay control device for generating a relay control signal in accordance with a relay interrupt command transferred from the main control unit, an SLIC for interfacing a call signal to a subscriber's phone, a ring signal generator for generating a ring signal transferred to the subscriber's phone, and transferring a synchronous signal, which generates a relay control signal, to the relay control device, and a relay for selectively transferring the call signal and the ring signal to the subscriber's phone from the SLIC and the ring signal generator.

19 Claims, 5 Drawing Sheets

RING RELAY CONTROL UNIT FOR FOREIGN EXCHANGE STATION

CROSS REFERENCE TO RELATED ART

This application claims the benefit of Korean Patent Application No. 2000-60992, filed on Oct. 17, 2000, which is hereby incorporated by reference in its entirety.

BACKGROUND OF THE INVENTION

1. Field of the Invention

The present invention relates to a foreign exchange station (FXS), and in particular, to a ring relay control unit for use in the FXS that is capable of protecting a ring relay and reducing noise.

2. Discussion of the Related Art

FIG. 1 is a schematic block diagram illustrating the construction of a conventional ring relay control unit of an FXS. In FIG. 1, the ring relay control unit 100 of a conventional FXS comprises a main control unit 130 for controlling a relay interrupt command, a ring signal generator 110 for generating a ring signal which is transferred to a subscriber's phone 150, a subscriber line interface circuit (SLIC) for interfacing a call signal to the subscriber's phone 150, and a relay 140 for selectively transferring the call signal and the ring signal to the subscriber's phone 150 from the SLIC 120 and the ring signal generator 110 in accordance with a relay interrupt command by the main control unit 130.

The ring relay control unit 100 constructed as above interfaces the relay 140 to a terminal 2 when the subscriber's phone 150 is engaged in communication, and interfaces the relay 140 to a terminal 1 when transferring the ring signal to the subscriber's phone 150. Thus, the ring relay control unit 100 selectively transfers the ring signal and the call signal to the subscriber's phone 150.

FIG. 2 is a diagram illustrating the timing of generating a ring relay control signal by the conventional ring relay control unit 100. In FIG. 2, a ring signal generated by the ring signal generator 110 continuously generates sine waves. The ring relay control unit 100 interfaces the relay 140 to the terminal 1 in accordance with a relay interrupt command sent by the main control unit 130, and transfers the ring signal generated by the ring signal generator 110 to the subscriber's phone 150.

Thus, the voltage applied to the relay 140 from the ring signal generator 110 is variable, dependent on the timing of the generation of the relay interrupt command transferred from the main control unit 130. This means that the voltage applied to the relay 140 from the ring signal generator 110 is variable in a wide range depending on the point of time when the relay interrupt command is generated as shown in FIG. 2.

Such variable voltage loaded on the relay 140 poses a danger of damaging the relay 140 and has the drawback of generating switching noise due to an interrupt of an overvoltage signal.

Also, in the case where the relay 140 interfaced to the terminal 2 transfers the call signal to the subscriber's phone 150 from the SLIC 120, the ring signal generator 110 continuously generates the ring signals, thereby deteriorating the efficiency of and wasting the electric power.

SUMMARY OF THE INVENTION

Accordingly, the present invention is directed to a ring relay control unit that substantially obviate one or more of the problems due to limitations and disadvantages of the related art.

It is, therefore, an object of the present invention to provide a ring relay control unit for use in the FXS that is capable of protecting a relay from high voltage.

It is another object of the present invention to reducing electrical noise as well as capable of saving electric power by interrupting a ring relay under low voltage when transferring the ring signal from the FXS to a subscriber's phone.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve the above object, there is provided a ring relay control unit of a foreign exchange station for signaling a subscriber telephone comprises a main control unit for generating a relay interrupt command; a relay control device connected to the main control unit to generate a relay control signal and a ring generation inhibit signal in response to the relay interrupt command from the main control unit; a ring signal generator connected to the relay control device for generating a ring signal to the subscriber telephone in response to the ring generation inhibit signal, and for transmitting a synchronous signal to the relay control device, wherein the relay control device generates the relay control signal in response to the synchronous signal; and a relay for selectively transferring the ring signal to the subscriber telephone from the ring signal generator in response to the relay control signal.

According to one aspect of the present invention, the ring relay control unit further comprises a SLIC for interfacing a call signal to the subscriber telephone. The relay selectively transfers the call signal and the ring signal to the subscriber telephone from the SLIC and the ring signal generator.

According to another aspect of the present invention, the synchronous signal transferred to the relay control device is a zero-crossing synchronous signal.

According to another aspect of the present invention, the relay control device generates the relay control signal to interface the relay to the SLIC and transmits the ring generation inhibit signal to the ring signal generator if the relay interrupt command is received from the main control unit to interface the call signal to the subscriber telephone.

According to another aspect of the present invention, the relay control device comprises a first D flip-flop for generating the relay control signal in response to the relay interrupt command from the main control unit and the synchronous signal from the ring control generator. The relay control device also includes a second D flip-flop for generating the ring generation inhibit signal in response to the relay interrupt command from the main control unit and the synchronous signal from the ring control generator.

According to the present invention, a method of signaling a subscriber telephone using a ring relay control unit of a foreign exchange station comprises the steps of generating a relay interrupt command from a main control unit for; generating a relay control signal from a ring relay control device in response to the relay interrupt command from the main control unit and to generate a ring generation inhibit signal; generating a ring signal with a ring signal generator to the subscriber telephone in response to the ring generation inhibit signal, and transmitting a synchronous signal to the relay control device, wherein the relay control device generates the relay control signal in response to the synchronous signal; and selectively transferring the ring signal to the subscriber telephone from the ring signal generator using a relay in response to the relay control signal.

Thus, the present invention has the advantages of protecting the relay, reducing noise generation, and saving electric power by interrupting a ring relay at low voltage when transferring the ring signal to the subscriber's phone from the FXS.

It is to be understood that both the foregoing general description and the following detailed description are exemplary and explanatory and are intended to provide a further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and, together with the description, serve to explain the principles of the invention.

DETAILED DESCRIPTION OF THE PREFERRED EMBODIMENTS

A preferred embodiment of the present invention will now be described with reference to the accompanying drawings. In the following description, reference is made to the accompanying drawings which form a part hereof and which illustrate the preferred embodiment of the present invention. It is understood that other embodiments may be utilized and structural and operational changes may be made without departing from the scope of the present invention.

Figure 1:
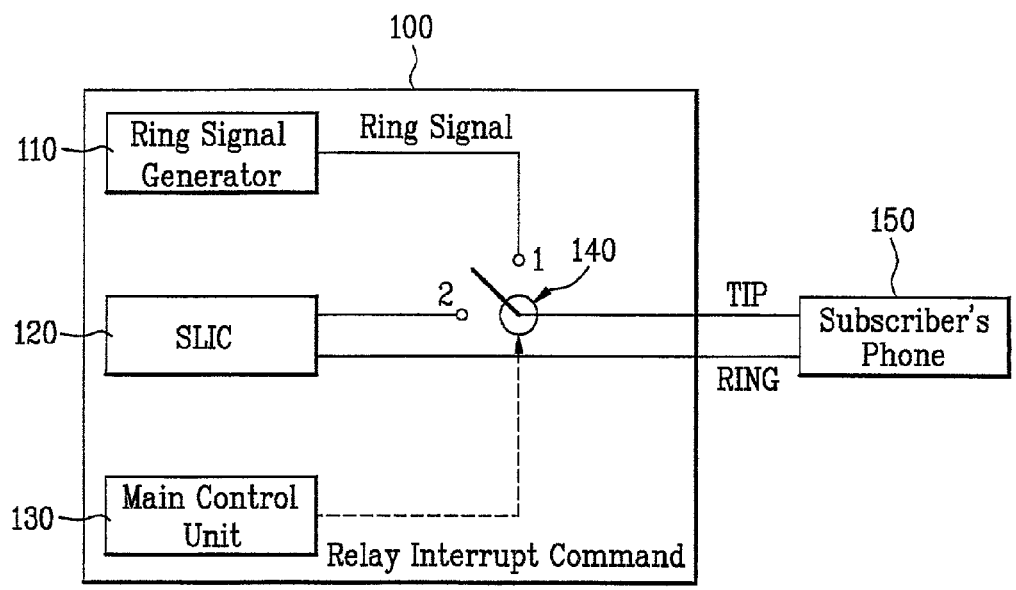
FIG. 1 is a schematic block diagram illustrating a construction of a conventional ring relay control unit of an FXS.
Figure 2:
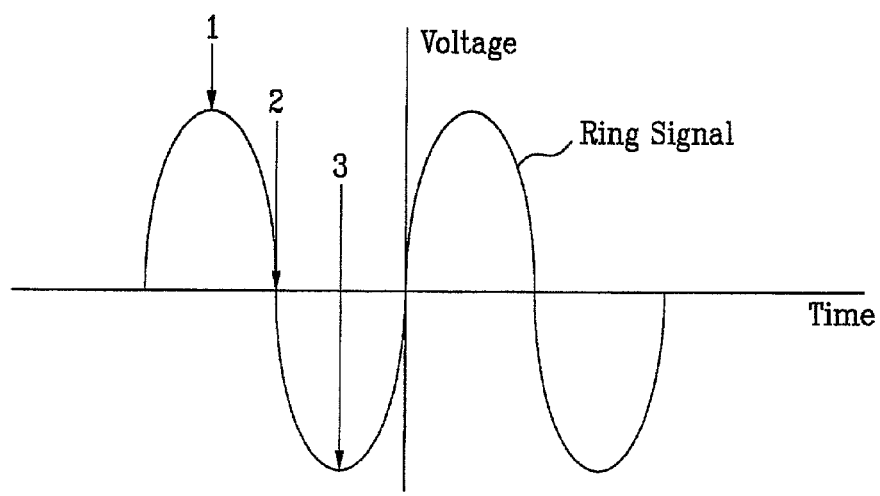
FIG. 2 is a ring signal generated by a ring relay control signal by the conventional ring relay control unit of the FXS.
Figure 3:
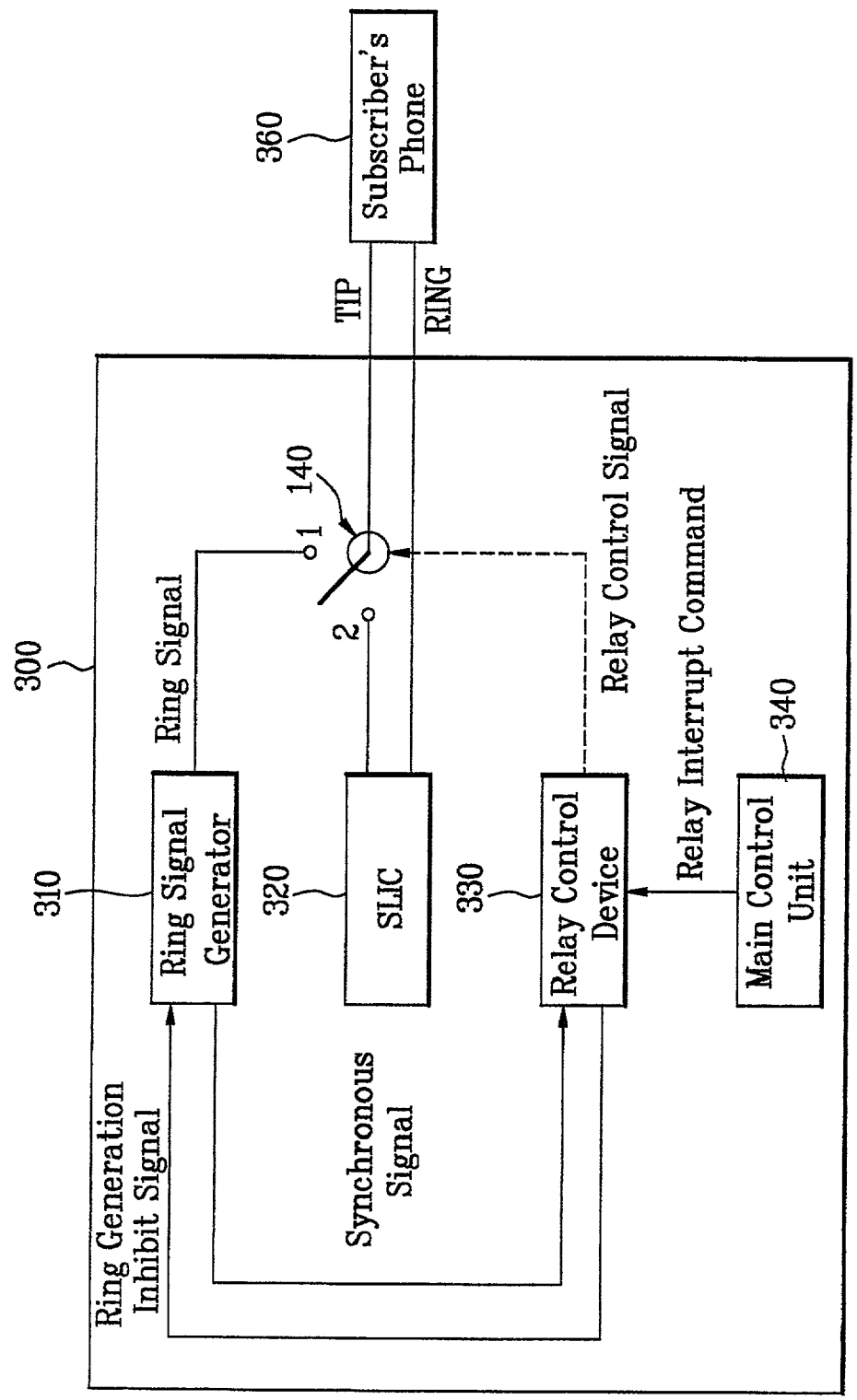
FIG. 3 is a schematic block diagram of a ring relay control unit of an FXS according to the present invention.

FIG. 3 is a schematic block diagram illustrating the construction of a ring relay control unit 300 of an FXS according to a preferred embodiment of the present invention. In FIG. 3, the ring relay control unit 300 according to the present invention comprises a main control unit 340 for controlling a ring relay interrupt command, a relay control device 330 for generating a relay control signal in accordance with a relay interrupt command transferred from the main control unit 340, an SLIC 320 for interfacing a call signal to a subscriber's phone 360, a ring signal generator 310 for transferring a synchronous signal to the relay control device 330 to generate a relay control signal, and a relay 350 for selectively transferring the call signal and the ring signal to the subscriber's phone 360 from the SLIC 320 and the ring signal generator 310 in accordance with the relay control signal transferred from the relay control device 330.

Preferably, the relay control device 330 transmits a ring generation inhibit signal to the ring signal generator 310 to inhibit generation of the ring signal if a relay interrupt command is transferred from the main control unit 340 to the subscriber's phone to interface the call signal.

Figure 4:
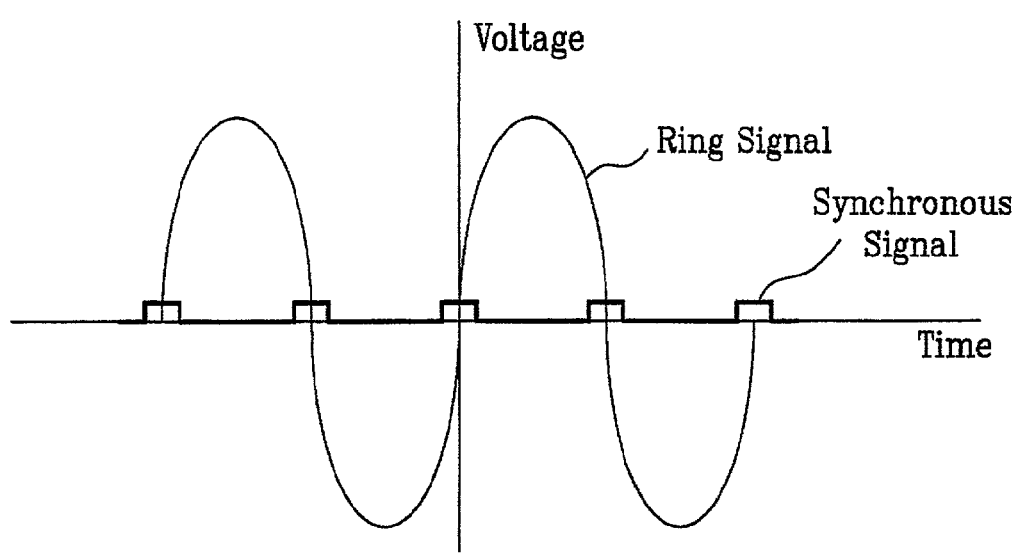
FIG. 4 is ring signal and sync signal of the ring relay control unit of the FXS according to the present invention.
Figure 5:
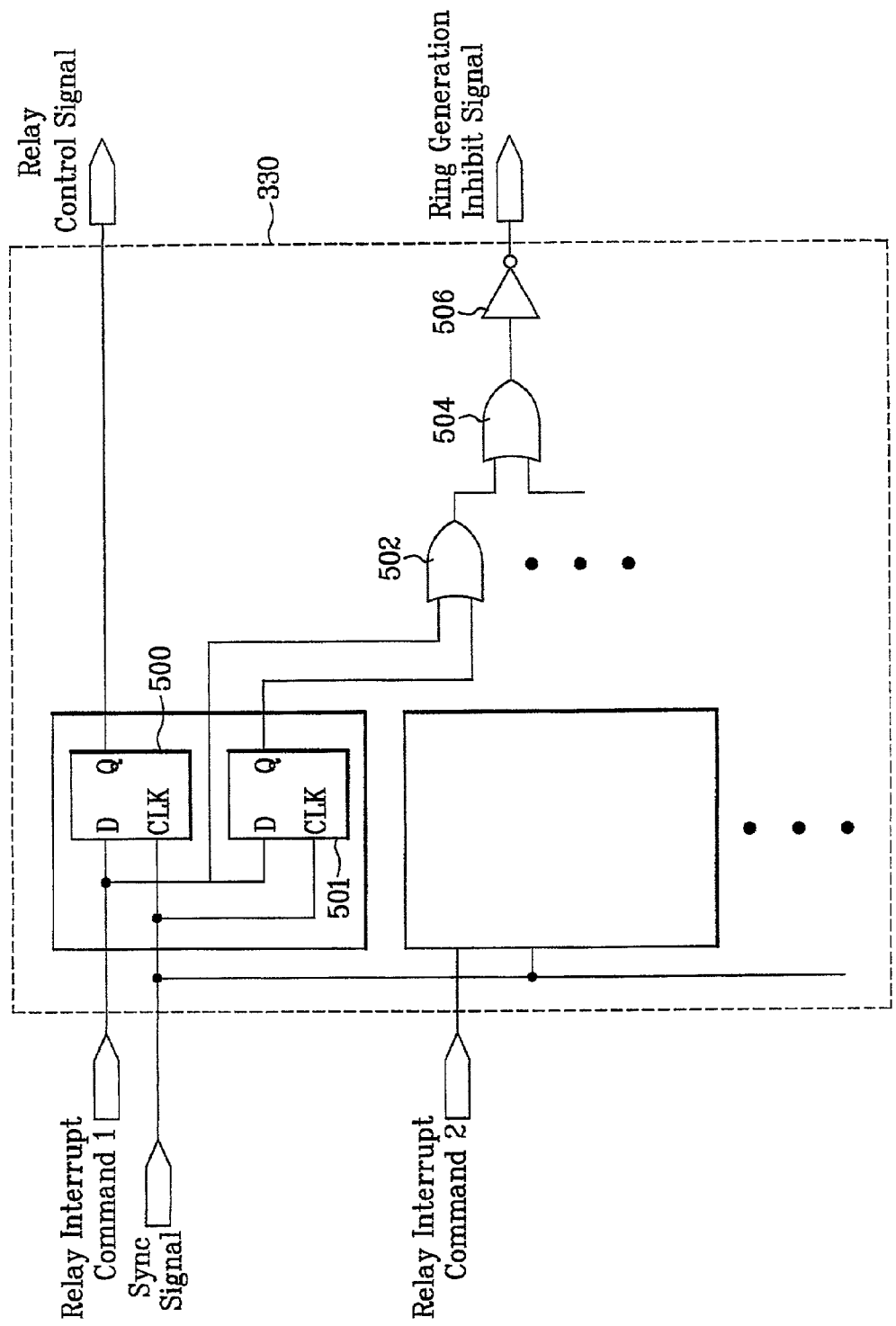
FIG. 5 is a block diagram exemplifying the logic for generating a relay control signal in the ring relay control unit of the FXS according to the present invention.

FIG. 4 is a diagram illustrating the timing of generating a ring relay control signal by the ring relay control unit of the FXS according to the present invention. FIG. 5 is block diagram exemplifying the logic for generating a relay control signal in the ring relay control unit of the FXS according to the present invention.

According to the preferred embodiment, the relay control device 330 in FIG. 3 may be implemented using, for example, using the D flip-flop 500 as shown in FIG. 5. The D flip-flop 500 generates a relay control signal to control the relay 350 in accordance with the relay interrupt command transmitted from the main control unit 340 and the synchronous signal transmitted from the ring signal generator 310. Alternatively, other suitable logic devices known to one of ordinary skill in the art may also be substituted in lieu of the D flip-flops 500 and 501 as a delay device or a latch.

Preferably, the ring signal generator 310 controls timing for generating the relay control signal applied to the relay 350 by generating a synchronous signal of a zero-crossing signal, as shown in FIG. 4, and by applying the synchronous signal to the relay control device 330, e.g., to the D flip-flop 500.

Thus, a low voltage of about 0V is applied to the relay 350 from the ring signal generator 310 in accordance with the relay control signal generated from the D flip-flop 500.

The relay control device 330 generates a relay control signal to interface the relay 350 to the SLIC 320 by connecting the relay 350 to a terminal 2 if the relay interrupt command is transferred from the main control unit 340. This transfers the call signal to the subscriber's phone 360 while transmitting the ring generation inhibit signal to the ring signal generator 310 to inhibit generation of the ring signal. As a consequence, the ring signal generator 310 does not generate a ring signal in accordance with the ring generation inhibit signal transmitted from the relay control device 330. By doing so, electric power can be saved.

FIG. 5 is a circuit diagram exemplifying the logic for generating a relay control signal in the ring relay control unit 330 of the FXS according to the preferred embodiment of the present invention. Referring to FIG. 5, the relay control unit 330 is responsive to the relay interrupt command from the main control unit 340 and the sync signal from the ring signal generator 310. The relay control unit 330 outputs a relay control signal to the relay 140 and also outputs a ring generation inhibit signal to the ring signal generator 310.

According to the preferred embodiment, the relay control unit 330 has a plurality of ports for control corresponding number of relays in response to corresponding number of ring signal generators 310. Each port is identical, and therefore only one will be described for the sake of brevity.

As described above, each port of the relay control unit 330 has two D flip-flops 500 and 501. The input of the D flip-flop 500 is connected to the main control unit 340 to receive the relay interrupt command therefrom. The clock of the D flip-flip 500 is connected to the ring signal generator 310 to receive the sync signal. The output of the D flip-flip 500 is the relay control signal and is provided to the relay 140 to enable/disable the relay 140.

The second D flip-flop 501 uses the same input as the first D flip-flop 500 and provides the output signal to an array of NOR gates 502 and 504 and inverter 506 to produce the ring generation inhibit signal which is provided to the ring signal generator 310.

Figure 6:
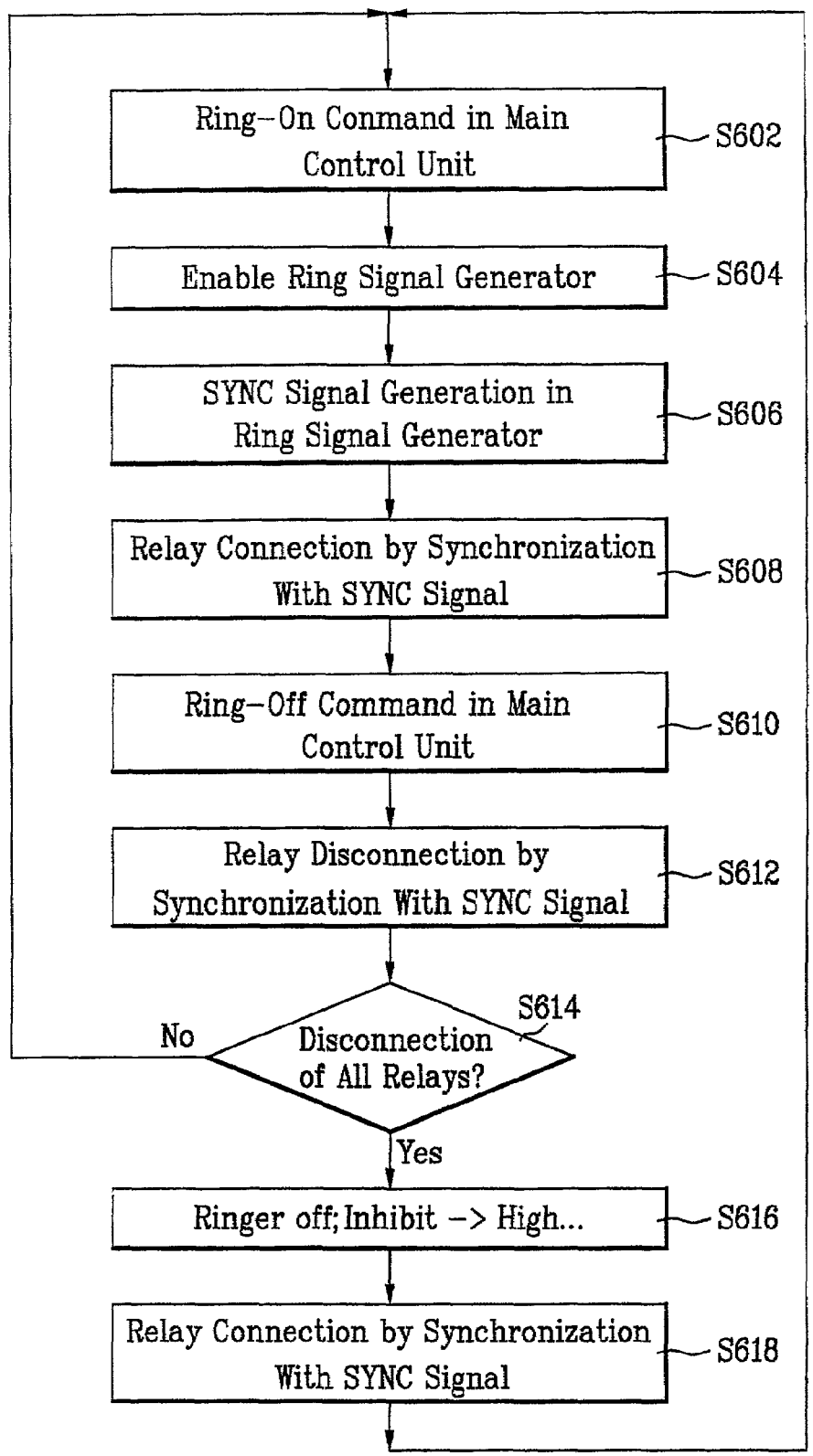
FIG. 6 is a flow chart showing the operation of the present invention.

FIG. 6 is a flow chart showing the operation of the present invention. Referring to FIGS. 3 and 6, the FXS system receives an instruction to ring the subscriber's telephone. Consequently, the main control unit 340 initiates the ring-on process in step S602. The ring signal generator 310 is enabled by disabling (e.g., logic "0") the ring generation inhibit signal in step S604. Then the ring signal generator 310 generates the sync signal to the relay control device 330 in step S606. As the sync signal is received by the relay control device 330, the relay control signal is enabled to enable the relay 140, which in turn connects the ring signal from the ring signal generator 310 to the subscriber's phone 360 in step S608.

Thereafter, the main control unit 340 initiates the ring-off process in step S610 by enabling the relay interrupt command to the relay control device 330. As another sync signal is received from the ring signal generator 310, the relay control device 330 disables the relay control signal to the relay 140, thus disconnecting the ring signal from the ring signal generator 310 and the subscriber's phone 360 in step S612.

If the relay connections are disabled, the process flow starts again from step S602. If not, the relay control device 330 enables the ring generation inhibit signal to force the ring signal generator 310 to disable generation of a ring signal in step S616. Thereafter, a subsequent sync signal causes the relay control device 330 to enable the relay control signal to enabled the relay 140 in step S618. However, because the ring signal is disabled, the subscriber's phone does not ring.

As described above, the ring relay control unit 300 according to the present invention has the advantages of protecting the relay, reducing noise generation, and saving electric power by interrupting a ring relay at low voltage when transferring the ring signal to the subscriber's phone from the FXS.

The foregoing embodiments and advantages are merely exemplary and are not to be construed as limiting the present invention. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A ring relay control unit of a foreign exchange station for signaling a subscriber telephone, the ring relay control unit comprising:
    a main control unit for generating a relay interrupt command;
    a relay control device connected to the main control unit to generate a ring generation inhibit signal in response to the relay interrupt command to disable generation of a ring signal;
    a ring signal generator connected to the relay control device to generate a ring signal to the subscriber telephone in response to the ring generation inhibit signal and to transmit a synchronous signal to the relay control device,
    wherein the relay control signal is generated in response to the synchronous signal; and
    a relay for selectively transferring the ring signal to the subscriber telephone from the ring signal generator in response to the relay control signal, wherein the synchronous signal controls timing of the relay control signal to selectively transfer one of the ring signal or a call signal to the subscriber telephone.

2. The ring relay control unit of claim 1, wherein the relay initiates transfer of the ring signal to the subscriber telephone upon a low voltage period of the ring signal to prevent damage to and reduce switching noise generated by the relay.

3. The ring relay control unit of claim 1, wherein the ring signal generator generates the synchronous signal transferred to the relay control device is a zero-crossing synchronous signal.

4. The ring relay control unit of claim 1, wherein the relay control device generates the relay control signal to interface the relay to the SLIC and transmits the ring generation inhibit signal to the ring signal generator if the relay interrupt command is received from the main control unit to interface the call signal to the subscriber telephone.

5. The ring relay control unit of claim 4, wherein the relay control device comprises a D flip-flop for generating the relay control signal in response to the relay interrupt command from the main control unit and the synchronous signal from the ring control generator.

6. The ring relay control unit of claim 5, wherein the relay control device comprises a second D flip-flop for generating the ring generation inhibit signal in response to the relay interrupt command from the main control unit and the synchronous signal from the ring control generator.

7. A ring relay control unit of a foreign exchange station for signaling a subscriber telephone, the ring relay control unit comprising:
    a main control unit for generating a relay interrupt command;
    a relay control device connected to the main control unit to generate a relay control signal and a ring generation inhibit signal in response to the relay interrupt command from the main control unit;
    a ring signal generator connected to the relay control device for generating a ring signal to the subscriber telephone in response to the ring generation inhibit signal, and for transmitting a synchronous signal to the relay control device, wherein the relay control device generates the relay control signal in response to the synchronous signal;
    a relay for selectively transferring the ring signal to the subscriber telephone from the ring signal generator in response to the relay control signal;
    a SLIC for interfacing a call signal to the subscriber telephone, wherein the relay selectively transfers the call signal and the ring signal to the subscriber telephone from the SLIC and the ring signal generator,
    wherein the relay control device generates the relay control signal to interface the relay to the SLIC and transmits the ring generation inhibit signal to the ring signal generator if the relay interrupt command is received from the main control unit to interface the call signal to the subscriber telephone.

8. The ring relay control unit of claim 7, wherein the relay control device comprises a D flip-flop for generating the relay control signal in response to the relay interrupt command from the main control unit and the synchronous signal from the ring control generator.

9. A ring relay control unit of a foreign exchange station for signaling a subscriber telephone, the ring relay control unit comprising:
    a main control unit for generating a relay interrupt command;
    a relay control device connected to the main control unit to generate a relay control signal and a ring generation inhibit signal in response to the relay interrupt command from the main control unit;
    a ring signal generator connected to the relay control device for generating a ring signal to the subscriber telephone in response to the ring generation inhibit signal, and for transmitting a synchronous signal to the relay control device, wherein the relay control device generates the relay control signal in response to the synchronous signal; and
    a relay for selectively transferring the ring signal to the subscriber telephone from the ring signal generator in response to the relay control signal,
    wherein the relay control device comprises a D flip-flop for generating the relay control signal in response to the relay interrupt command from the main control unit and the synchronous signal from the ring control generator.

10. The ring relay control unit of claim 9, wherein the relay control device comprises a second D flip-flop for generating the ring generation inhibit signal in response to the relay interrupt command from the main control unit and the synchronous signal from the ring control generator.

11. A method of signaling a subscriber telephone using a ring relay control unit of a foreign exchange station, the method comprising:
   generating a relay interrupt command by a main control unit;
   generating a relay control signal and a ring generation inhibit signal by a ring relay control device in response to the relay interrupt command from the main control unit;
   generating a ring signal by a ring signal generator for the subscriber telephone in response to the ring generation inhibit signal;
   transmitting a synchronous signal to the relay control device, wherein the relay control device generates the relay control signal in response to the synchronous signal; and
   selectively transferring the ring signal to the subscriber telephone, in response to the relay control signal, from the ring signal generator initially is set at a low voltage level,
   wherein the low voltage level reduces generated switching noise and protects the relay from large initial voltage levels upon transition to the ring signal generator.

12. The method of claim 11, further comprising:
   interfacing a call signal from a SLIC to the subscriber telephone, wherein the relay selectively transfers the call signal and the ring signal to the subscriber telephone from the SLIC and the ring signal generator and wherein the ring signal is initially transferred to the subscriber telephone upon a low voltage period of a cycle of the ring signal.

13. The method of claim 11, wherein the synchronous signal transferred to the relay control device is a zero-crossing synchronous signal generated at a zero-crossing of the ring signal.

14. The method of claim 11, wherein the relay control device comprises a D flip-flop for generating the relay control signal in response to the relay interrupt command from the main control unit and the synchronous signal from the ring control generator.

15. The method of claim 14, wherein the relay control device comprises a second D flip-flop for generating the ring generation inhibit signal in response to the relay interrupt command from the main control unit and the synchronous signal from the ring control generator.

16. A method of signaling a subscriber telephone using a ring relay control unit of a foreign exchange station, the method comprising:
   generating a relay interrupt command from a main control unit;
   generating a relay control signal and a ring generation inhibit signal from a ring relay control device in response to the relay interrupt command from the main control unit;
   generating a ring signal with a ring signal generator to the subscriber telephone in response to the ring generation inhibit signal; and transmitting a synchronous signal to the relay control device, wherein the relay control device generates the relay control signal in response to the synchronous signal; and
   selectively transferring the ring signal to the subscriber telephone from the ring signal generator using a relay in response to the relay control signal,
   wherein the relay control device generates the relay control signal to interface the relay to the SLIC and transmits the ring generation inhibit signal to the ring signal generator if the relay interrupt command is received from the main control unit to interface the call signal to the subscriber telephone.

17. The method of claim 16, wherein the relay control device comprises a D flip-flop for generating the relay control signal in response to the relay interrupt command from the main control unit and the synchronous signal from the ring control generator.

18. A ring relay control unit of a foreign exchange station for signaling a subscriber telephone, the ring relay control unit comprising:
   a main control unit for generating a relay interrupt command;
   a relay control device connected to the main control unit to generate a relay control signal and a ring generation inhibit signal in response to the relay interrupt command from the main control unit;
   a ring signal generator connected to the relay control device for generating a ring signal to the subscriber telephone in response to the ring generation inhibit signal, and for transmitting a synchronous signal to the relay control device, wherein the relay control device generates the relay control signal in response to the synchronous signal;
   a SLIC for interfacing a call signal to the subscriber telephone; and
   a relay for selectively transferring the call signal and the ring signal to the subscriber telephone from the ring signal generator in response to the relay control signal, wherein
   the relay control device comprises a first delay device to generate the relay control signal and a second delay device to generate the ring generation inhibit signal in response to the relay interrupt command from the main control unit and the synchronous signal from the ring control generator.

19. A ring relay control unit of a foreign exchange station for signaling a subscriber telephone, the ring relay control unit comprising:
   main control means for generating a relay interrupt command;
   relay control means for generating a relay control signal and a ring generation inhibit signal in response to the relay interrupt command from the main control unit;
   ring signal generating means for generating a ring signal to the subscriber telephone in response to the ring generation inhibit signal, and for transmitting a synchronous signal to the relay control means, wherein the relay control means generates the relay control signal in response to the synchronous signal; and
   switching means for selectively transferring the ring signal to the subscriber telephone from the ring signal generating means in response to the relay control signal, wherein
   the relay control means comprises a first delay means to generate the relay control signal and a second delay means to generate the ring generation inhibit signal in response to the relay interrupt command and the synchronous signal.

* * * * *